United States Patent
Huang et al.

(10) Patent No.: US 8,532,216 B2
(45) Date of Patent: Sep. 10, 2013

(54) MIMO DETECTION METHOD AND SYSTEM BASED ON CHANNEL CORRELATION

(75) Inventors: Zhousong Huang, Beijing (CN); Hanbing Zhou, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 321 days.

(21) Appl. No.: 12/993,752

(22) PCT Filed: May 11, 2009

(86) PCT No.: PCT/KR2009/002461
§ 371 (c)(1),
(2), (4) Date: Nov. 19, 2010

(87) PCT Pub. No.: WO2009/142407
PCT Pub. Date: Nov. 26, 2009

(65) Prior Publication Data
US 2011/0069776 A1    Mar. 24, 2011

(30) Foreign Application Priority Data
May 19, 2008  (CN) .......................... 2008 1 0097162

(51) Int. Cl.
*H04B 7/08* (2006.01)
(52) U.S. Cl.
USPC ....................................................... 375/267

(58) Field of Classification Search
USPC ................ 375/260, 262, 265, 267; 370/208, 370/210
See application file for complete search history.

(56) References Cited

U.S. PATENT DOCUMENTS

| | | | |
|---|---|---|---|
| 2003/0076900 A1* | 4/2003 | Magee et al. ................. | 375/316 |
| 2003/0078024 A1* | 4/2003 | Magee et al. ................. | 455/296 |
| 2004/0252629 A1* | 12/2004 | Hasegawa et al. ............ | 370/208 |
| 2005/0195734 A1 | 9/2005 | Sandell et al. | |
| 2006/0153144 A1 | 7/2006 | Kwun et al. | |
| 2008/0144752 A1* | 6/2008 | Zhou et al. .................... | 375/347 |
| 2011/0059713 A1* | 3/2011 | Okello et al. ................. | 455/296 |

OTHER PUBLICATIONS

PCT/ISA/237 Written Opinion issued in PCT/KR2009/002461 (5pp), Dec. 15, 2009.

* cited by examiner

*Primary Examiner* — Young T. Tse
(74) *Attorney, Agent, or Firm* — The Farrell Law Firm, P.C.

(57) ABSTRACT

An OFDM symbol detection method is provided, which includes receiving OFDM modulated symbols transmitted from multiple transmitting antennas; receiving information on correlation time and/or correlation bandwidth; performing channel estimation on each of a plurality of channels for the multiple transmitting antennas, and conducting smoothing processing on each channel estimation result according to the information on correlation time and/or correlation bandwidth, to obtain channel estimation averages of respective channels; and performing signal detection on the received OFDM symbols by using the channel estimation averages. Both time correlation and frequency correlation are considered in the method.

18 Claims, 6 Drawing Sheets

MIMO DETECTION METHOD AND SYSTEM BASED ON CHANNEL CORRELATION

PRIORITY

This application claims priority under 35 U.S.C. §119(a) to a Chinese patent application filed on May 19, 2008, and assigned Application No. 200810097162.6, and the benefit under 35 U.S.C. §365(c) of International Application No. PCT/KR2009/002461 filed on May 11, 2009, the contents of which are incorporated herein by reference.

BACKGROUND OF THE INVENTION

1. Field of the Invention

The present invention relates generally to a Multiple-Input Multiple-Output (MIMO) communication system, and more particularly, to a method applied in a receiver of a MIMO system for MIMO detection in an existing or future information transmission system.

2. Description of the Related Art

Conventionally, channels are first estimated when a receiver in the MIMO system detects a signal from a transmitting counterpart. According to the estimated channels and using a method of Minimum Mean Squared Error-Ordered Successive Interference Cancellation (MMSE-OSIC) or Minimum Mean Squared Error-Ordered Successive Interference Cancellation—Multiple Candidates (MMSE-OSIC$^2$), data is detected separately for channels, i.e., one channel is independent of another channel.

A 2×4 MIMO detection process may be used as an example, in which the transmitted data, ×1 and ×2, are to be detected. According to conventional detection methods, it is necessary to detect ×1, and then to estimate ×2 according to the detection result of ×1. The difference between MMSE-OSIC and MMSE-OSIC$^2$ lies in that only one possibility is decided when implementing MMSE-OSIC detection of ×1, while several candidates are decided when implementing MMSE-OSIC$^2$ detection of ×1. With the increasing number of candidates, the detection performance improves, however the detection complexity also increases accordingly. When the number of candidates equals 1, the two detection methods are exactly the same.

The term, a correlation time, used herein refers to a specific time interval, within which amplitudes of two arrived signals are highly correlated. The term, a correlation bandwidth, refers to a specific frequency range, within which the amplitudes of two frequency components are highly correlated.

The existing techniques are disadvantageous in that property of channel correlation is not used in the data detection, because data detection in the existing method is implemented separately for channels. In an environment having noise bursts, it is possible for great burst of estimation deviation to happens randomly. In this case, if signal detection is implemented to the channel with great estimation deviation, a great error occurs or the Bit Error Rate (BER) increases in signal decision.

The existing technique is also disadvantageous in that in order to obtain specific BER performance, a hardware resource for the decoding method, which is directly proportional to the number of candidates in MMSE-OSIC$^2$, is required.

SUMMARY OF THE INVENTION

The present invention has been made to address at least the above problems and/or disadvantages and to provide at least the advantages described below. Accordingly, an aspect of the present invention provides an Orthogonal Frequency Division Multiplexing (OFDM) symbol detection method and OFDM system based on channel correlation.

According to one aspect of the present invention, an OFDM symbol detection method is provided. OFDM modulated symbols transmitted from a plurality of transmitting antennas are received. Information on at least one of a correlation time and a correlation bandwidth is received. Channel estimation is performed on each of a plurality of channels for the plurality of transmitting antennas, and smoothing processing is conducted on each channel estimation result according to the information on the at least one of the correlation time and the correlation bandwidth, so as to obtain channel estimation averages of respective channels. Signal detection is performed on the received OFDM modulated symbols by using the channel estimation averages.

According to another aspect of the present invention, an OFDM communication system is provided. The system includes a transmitting end, having a plurality of transmitting antennas for transmitting OFDM modulated symbols and information on at least one of a correlation time and a correlation bandwidth to a receiving end. The system also includes the receiving end having a plurality of receiving antennas for receiving the OFDM modulated symbols, a number of correlated sub-carriers and a number of correlated OFDM symbols from the transmitting end. The system also includes a smoothing filter for conducting smoothing processing on each channel estimation result according to the information on the at least one of the correlation time and the correlation bandwidth, so as to obtain channel estimation averages of respective channels. The channel estimation result is obtained by performing channel estimation on each of a plurality of channels for the plurality of transmitting antennas. The system additionally includes a signal detection module for performing signal detection on the received OFDM modulated symbols by using the channel estimation averages of the plurality of channels.

A MIMO receiver in an OFDM communication system is also provided. The receiver includes a receiving end, having a plurality of receiving antennas for receiving OFDM modulated symbols, a number of correlated sub-carriers and a number of correlated OFDM symbols, from a transmitting end. The receiver also includes a smoothing filter for conducting smoothing filtering to each channel estimation result according to information on at least one of a correlation time and a correlation bandwidth. The channel estimation result is obtained by implementing channel estimation on each of a plurality of channels for a plurality of transmitting antennas, so as to obtain channel estimation averages of respective channels. The receiver further includes a signal detection module for performing signal detection on the received OFDM modulated symbols by using the channel estimation averages of the plurality of channels.

DETAILED DESCRIPTION OF EMBODIMENTS OF THE PRESENT INVENTION

Figure 1:
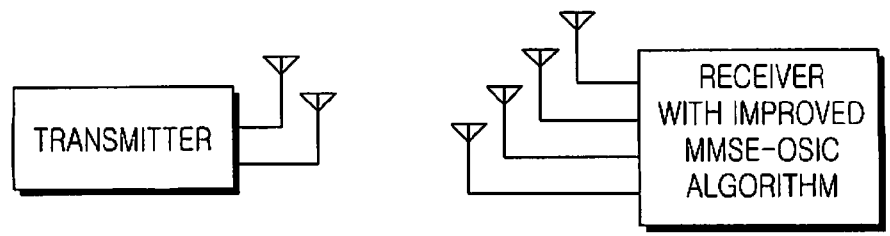
FIG. 1 is a diagram illustrating the MIMO operation environment.
Figure 2:
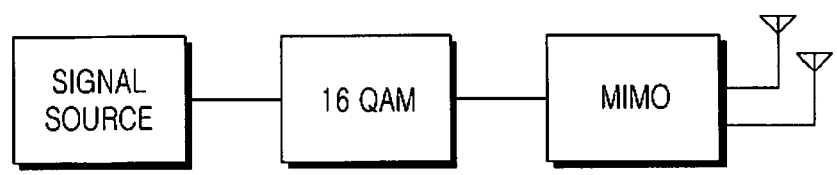
FIG. 2 is a diagram illustrating an example of the MIMO transmission flow.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

According to embodiments of the present invention, both time correlation and frequency correlation of channels are considered. Thus, with similar complexity, the performance is superior to that of the MMSE-OSIC-based method. Further, with reduced hardware resource, the performance approaches that of MMSE-OSIC$^2$-based method.

To describe the embodiments of the present invention clearly, the existing MMSE-OSIC$^2$ method is introduced.

Suppose a $N_T \times N_R$ MIMO system is expressed as Equation (1) below.

$$y = Hx + z \quad (1)$$

where Equation (2)

$$y = [y_1 y_2 \ldots y_{N_R}]^T \quad (2)$$

denotes a ($N_R \times 1$)-dimensional received signal vector, $N_T$ denotes the number of transmitting antennas, and $N_R$ denotes the number of receiving antennas.

A MIMO channel response is expressed as Equation (3) below.

$$H = \begin{bmatrix} h_{1,1} & h_{1,2} & \ldots & h_{1,N_T} \\ h_{2,1} & h_{2,2} & \ldots & h_{2,N_T} \\ \vdots & \vdots & \ddots & \vdots \\ h_{N_R,1} & h_{N_R,2} & \ldots & h_{N_R,N_T} \end{bmatrix} \quad (3)$$

where Equation (4)

$$x = [x_1 x_2 \ldots x_{N_T}]^T \quad (4)$$

denotes a ($N_T \times 1$)-dimensional received signal vector, and Equation (5)

$$z = [z_1 z_2 \ldots z_{N_R}]^T \quad (5)$$

denotes a noise vector which represents a cyclic symmetric white noise with the distribution being Equation (6).

$$z_i \sim CN(0, \sigma_z^2), i = 1, 2, \ldots, N_R \quad (6)$$

In this embodiment of the present invention, the transmitting signal of Equation (7)

$$x_i, i = 1, 2, \ldots, N_T \quad (7)$$

is a $|C|$-QAM modulated symbol, with C indicating a set of points in a corresponding constellation, and $|C|$ indicating the number of points in the constellation. The column vector of H is expressed as Equation (8) below.

$$h_k, k = 1, 2, \ldots, N_T \quad (8)$$

The MMSE weighting matrices of some channels is expressed as Equations (9)-(11) below.

$$G^{(1)} = (H_1^H H_1 + \sigma^2 I)^{-1} H_1^H, H_1 = [h_2 h_3 h_4] \quad (9)$$

$$G^{(2)} = (H_2^H H_2 + \sigma^2 I)^{-1} H_2^H, H_2 = [h_3 h_4] \quad (10)$$

$$G^{(3)} = (H_3^H H_3 + \sigma^2 I)^{-1} H_3^H, H_3 = [h_4] \quad (11)$$

Where $\{G^{(i)}\}_1$ is the first row of matrix $G^{(i)}$.

In the following description, a 4×4 MIMO system is used as an example to describe the existing MMSE-OSIC$^2$ method.

Step 1: Sort the 1, 2, . . . , $N_T$ ($N_T$=4 for the 4×4 MIMO system) channels to obtain a sorted sequence $h_1, h_2, \ldots, h_4$. Since the channels are complex channels and in the form of vectors, the sort process is implemented by comparing the norms of the vectors. Here, $h_1$ indicates the maximum norm of the four channels, and $h_{N_T}$ indicates the minimum norm of the four channels.

Step 2: Select M candidate symbols from the possible set of ×1. This step can be performed as illustrated in Table 1. The $h_1$ in Table 1 is obtained through Step 1.

Step 3: Select M candidate symbols from the possible set of ×1 and ×2. This step can be performed as illustrated in Table 2.

Step 4: Select M candidate symbols from the possible set of ×1, ×2 and ×3. This step can be performed as illustrated in Table 3.

Step 5: Select M candidate symbols from the possible set of ×1, ×2, ×3 and ×4. This step can be performed as illustrated in Table 4.

The slicer processing indicated in following tables is a processing for determining and outputting the closest constellation points from the symbols representing the constellation. For instance, in the case of 16 QAM, the closest constellation points from 16 levels representing the 16 QAM-modulated signals are determined and outputted. In the case of 64 QAM, the closest constellation points from 64 levels representing the 64 QAM-modulated signals are determined and outputted. The sorted processing indicated in following tables is a processing for sorting the $|C|$ distances in ascending order. In the case of 16 QAM, $|C|$=16, and in the case of 64 QAM, $|C|$=64.

TABLE 1

Step 2 in MMSE-OSIC$^2$

| | |
|---|---|
| 1 | Step 2 |
| 2 | for i = 1:$|C|$ |
| 3 | $\hat{x}_1$ = C(i) ← from all constellation points |
| 4 | $\bar{y}$ = y − $h_1 \hat{x}_1$ |
| 5 | for j = 2:$N_r$ |
| 6 | $\tilde{x}_j = \{G^{(j-1)}\}_1 \tilde{y}$ |
| 7 | $\hat{x}_j$ = slicer($\tilde{x}_j$) |
| 8 | $\tilde{y} = \tilde{y} − h_1 \hat{x}_1$ |
| 9 | end |
| 10 | x = [$\hat{x}_1 \hat{x}_2 \hat{x}_3 \hat{x}_4$] |
| 11 | D1(i) = $\|y − Hx\|^2$ |
| 12 | end |
| 13 | Candidate = Sorted(D) : select M candidates |

TABLE 2

Step 3 in MMSE-OSIC²

| 1 | Step 3 |
|---|---|
| 2 | for i = \|Candidate\| =M |
| 3 | $\hat{x}_1$ = Candidate(i) |
|   | ← from the previously selected M constellation points |
| 4 | $\bar{y}$=y−h₁$\hat{x}_1$ |
| 5 | for j = 1:\|C\| |
| 6 | $\hat{x}_2$ = C(j) ← from all constellation points |
| 7 | $\bar{y}$=$\bar{y}$−h₂$\hat{x}_2$ |
| 8 | for k = 3 : $N_r$ |
| 9 | $\tilde{x}_k$= {$G^{(1-2)}$}$_I$ $\bar{y}$ |
| 10 | $\hat{x}_k$= slicer($\tilde{x}_k$) |
| 11 | end |
| 12 | x = [$\hat{x}_1\hat{x}_2\hat{x}_3\hat{x}_4$] |
| 13 | D2(16*(i −1)+j) = \|\|y − Hx\|\|² |
| 14 | end |
| 15 | end |
| 16 | Candidate = Sorted(D2) : select M candidates |

TABLE 3

Step 4 in MMSE-OSIC²

| 1 | Step 4 |
|---|---|
| 2 | for i = \|Candidate\| =M |
| 3 | $\hat{x}_1$ = Candidate(i), |
|   | $\hat{x}_2$ = Candidate_2(i) |
|   | ←from the previously selected M constellation points |
| 4 | $\bar{y}$=y−h₁$\hat{x}_1$·h₂$\hat{x}_2$ |
| 5 | for j = 1:\|C\| |
| 6 | $\hat{x}_3$ = C(j) ← from all constellation points |
| 7 | $\bar{y}$=$\bar{y}$−h₃$\hat{x}_3$ |
| 8 | $\tilde{x}_4$= {$G^{13}$}$_j$$\bar{y}$ |
| 9 | $\hat{x}_4$ = slicer($\tilde{x}_4$) |
| 10 | x = [$\hat{x}_1\hat{x}_2\hat{x}_3\hat{x}_4$] |
| 11 | D3(16*(i−1)+j) = \|\|y − Hx\|² |
| 12 | end |
| 13 | end |
| 14 | Candidate = Sorted(D3) : select M candidates |

TABLE 4

Step 5 in MMSE-OSIC²

| 1 | Step 5 |
|---|---|
| 2 | for i = \|Candidate\| =M |
| 3 | $\hat{x}_1$ = Candidate(i), |
|   | $\hat{x}_2$ = Candidate_2(i), |
|   | $\hat{x}_3$ = Candidate_3(i) |
|   | ← from the previously selected M constellation points |
| 4 | $\bar{y}$=y−h₁$\hat{x}_1$·h₂$\hat{x}_2$·h₃$\hat{x}_3$ |
| 5 | for j = 1:\|C\| |
| 6 | $x_4$= C(j) ← from all constellation points |
| 7 | x = [$\hat{x}_1\hat{x}_2\hat{x}_3\hat{x}_4$] |
| 8 | D4(16*(i−1)+j) = \|\|y − Hx\|\|² |
| 9 | end |
| 10 | end |

Figure 3:
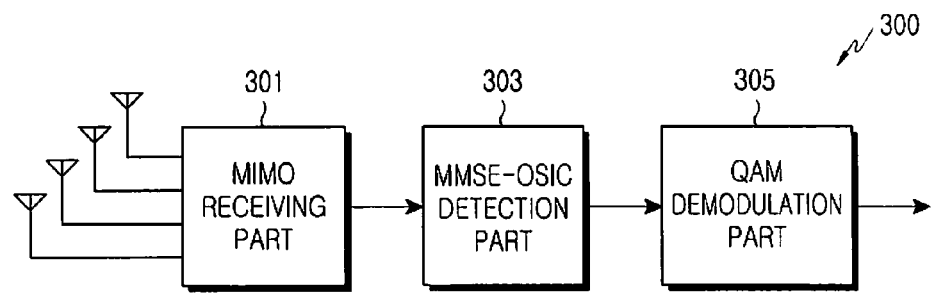
FIG. 3 is a diagram illustrating the MIMO receiving end, according to an embodiment of the present invention.
Figure 4:
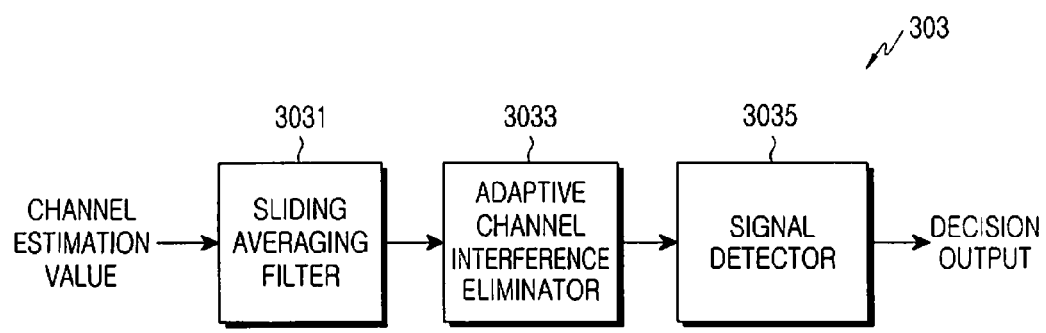
FIG. 4 is a block diagram illustrating the MIMO detection part, according to an embodiment of the present invention.
Figure 5:
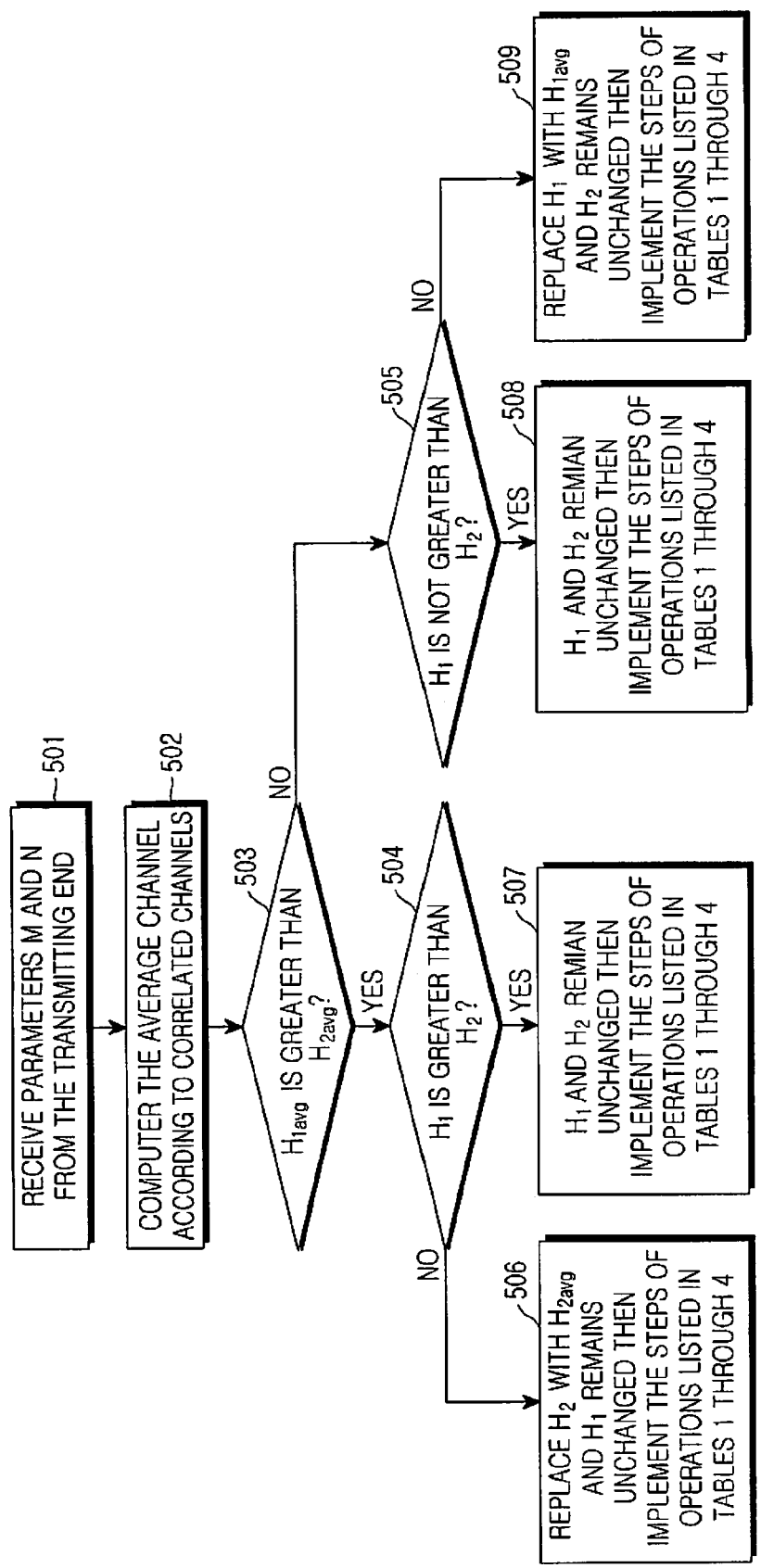
FIG. 5 is a flow diagram illustrating the MIMO signal detection method, according to an embodiment of the present invention.
Figure 6:
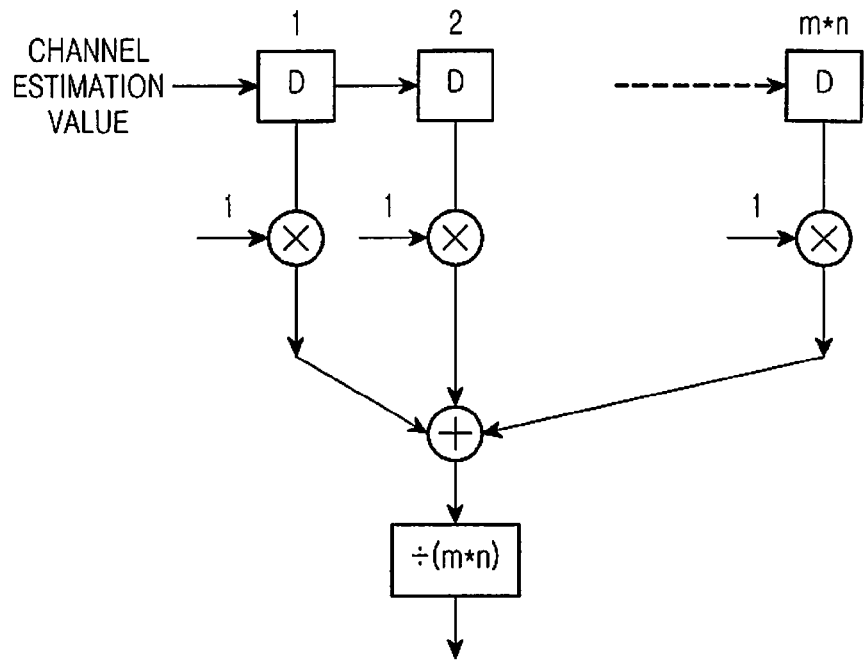
FIG. 6 is a diagram illustrating the smoothing filter, according to an embodiment of the present invention.

A signal detection method applied in the receiving end according to embodiments of the invention is described with reference to FIGS. 3-6. FIG. 3 is a diagram illustrating the MIMO receiving end, according to an embodiment of the present invention. FIG. 4 is a block diagram illustrating the MIMO detection part, according to an embodiment of the present invention. FIG. 5 is a flow diagram illustrating the MIMO signal detection method, according to an embodiment of the present invention. FIG. 6 is a diagram illustrating a structure of the smoothing filter, according to an embodiment the present invention.

Embodiments of the present invention are involved in the operations of Step 1 described above. As shown in FIG. 3, a receiving end 300, according to an embodiment of the present invention, may includes a MIMO receiving part 301 for receiving OFDM symbol data and relevant information transmitted by multiple transmitting antennas from a transmitting end. The receiving end 300 also includes a MMSE-OSIC signal detection part 303 for detecting signals from the transmitting end among the received data according to the received relevant information. The receiving end 300 additionally includes a QAM demodulation part 305 for demodulating the detected signal to obtain the demodulated data of the transmitting end.

The MIMO signal detection method, according to an embodiment of the present invention, is primarily implemented in the signal detection part 303. As shown in FIG. 4, the signal detection part 303 may include a sliding averaging filter 3031, an adaptive channel interference eliminator 3033 and a signal detector 3035. The signal detection method, according to an embodiment of the present invention, is described below with reference to FIGS. 5 and 6.

Referring to FIG. 5, the receiving part 301 in the receiving end 300 receives OFDM symbols and relevant information from the transmitting end in step 501. The relevant information includes the correlation time information (for example, the number (m) of the correlated sub-carriers), and the correlation bandwidth information (for example, the number of correlated OFDM symbols). The correlation time in the context refers to a specific time interval within which the amplitudes of two arrived signals are highly correlated. The correlation bandwidth refers to a specific frequency range within which the amplitudes of two frequency components are highly correlated.

The signal detection part 303 determines the strength of the channels from different receiving antennas according to the received number (m) of the correlated sub-carriers and the received number (n) of the correlated OFDM symbols. The approach for determining the strength of the channels is to respectively compute the norms of the four channels $h_1$, $h_2$, $h_3$ and $h_4$ (which are column vectors) first, and compare the four norms. If a column vector's norm is larger, the corresponding channel is stronger; otherwise, it is less strong. In the receiving end, the received signals are processed according to the determination.

Specifically, in step 502, in order to determine strength of the channels, the sliding averaging process is conducted to the receiving channels in the sliding averaging filter 3031 according to the received number (m) of the correlated sub-carriers and the received number (n) of the correlated OFDM symbols. The sliding averaging filter is a finite impulse response filter with a smoothing filtering function. Here, (m*n), which is dependent on channel correlation, indicates the number of tap coefficients. After smoothing processing, impact of transient interference on the receiver can be avoided, i.e., the strong interference signal can be suppressed automatically. The sliding averaging filter is illustrated in FIG. 6.

As shown in FIG. 6, (m*n) indicates the number of the tap coefficients of the sliding averaging filter, specifically, a length of the filter. D denotes a shift register. Channel norm(s) is (are) input into the sliding averaging filter. At the rising edge of the clock, a channel norm is shifted into the filter. The (m*n) channel impulse response values are summed with each channel impulse response value multiplying with one. The summation is divided by (m*n) and then outputted from the sliding averaging filter. Specifically, the (m*n) channels are averaged. After the sliding averaging process, strong interference components are suppressed for the channels. If m=1, the length of the sliding averaging process is n, i.e., the sliding averaging process is only conducted within the correlation time. If n=1, the length of the sliding averaging process is m, i.e., the sliding averaging process is only conducted within the correlation bandwidth. If both m and n are greater than 1, the sliding averaging process is conducted to the m*n channels within the correlation time and correlation bandwidth.

An adaptive selection is performed between the channels that are subject to sliding averaging and those are not subject to sliding averaging. $h_{1avg}$ denotes the first column of the sliding averaging processed channel matrix, $h_{2avg}$ denotes the second column of the sliding averaging processed channel matrix, while h1 and h2 respectively denote the first column and the second column of the channel matrix with no sliding averaging. The adaptive selection is to determine whether there is any strong interference in a channel. If there is strong interference in a channel, sliding averaging is implemented to eliminate the strong interference. If there is no strong interference in a channel, normal channels with no interference are selected.

Sliding averaging in a time domain, in a frequency domain or in both domains can be adopted by the sliding averaging filter. The filtering scheme based on an adaptively adjusted window is adopted by the sliding averaging filter 3031. The size of the window is adaptively adjusted according to the channel fading rate. If the channel fades fast, the size of the sliding window is adjusted to be smaller. If the channel fades slowly, the size of the sliding window is adjusted to be larger. During the process of channel strength determination, the channels in current OFDM symbols as well as the channels in 1~n OFDM symbols within the correlation time are considered. Thus, channels in current OFDM sub-carriers and channels in 1~m OFDM sub-carriers within the correlation bandwidth are considered.

An adaptive channel interference elimination process is performed on the channel values, which are subject to sliding averaging. Specifically, at Step 503, $h_{1avg}$ is compared with $h_{2avg}$. If $h_{1avg}$ is greater than $h_{2avg}$, the method proceeds to Step 504 to compare $h_1$ with $h_2$. If $h_1$ is greater than $h_2$, the method proceeds to Step 507, where $h_1$ and $h_2$ remain unchanged, and subsequent steps of Tables 1 through 4 follow. On the contrary, if $h_1$ is not greater than $h_2$, the method proceeds to Step 506, where $h_2$ is replaced with $h_{2avg}$, while $h_1$ remains unchanged, and the subsequent steps follow.

If $h_{1avg}$ is not greater than $h_{2avg}$, and $h_1$ is determined to be greater than $h_2$ in Step 505, the method proceeds to Step 509, where $h_1$ is replaced with $h_{1avg}$ while $h_2$ remains unchanged, and the subsequent steps of Tables 1 through 4 follow. On the contrary, if $h_1$ is not greater than $h_2$, the method proceeds to Step 508, where both $h_1$ and $h_2$ remain unchanged, and the subsequent steps follow.

System parameters of an embodiment according to the present invention are listed in Table 5.

TABLE 5

| System parameter | value |
| --- | --- |
| Carrie frequency | 3.775 GHz |
| Sample frequency | 40 MHz |
| Detection algorithm | Improved MMSE-OSIC |
| MIMO configuration | 2 × 4 |

TABLE 5-continued

| System parameter | value |
| --- | --- |
| Channel Model | Rayleigh fading channel with Doppler frequency shift of 30 Hz |
| Digital modulation scheme | 16 QAM |

Figure 7:
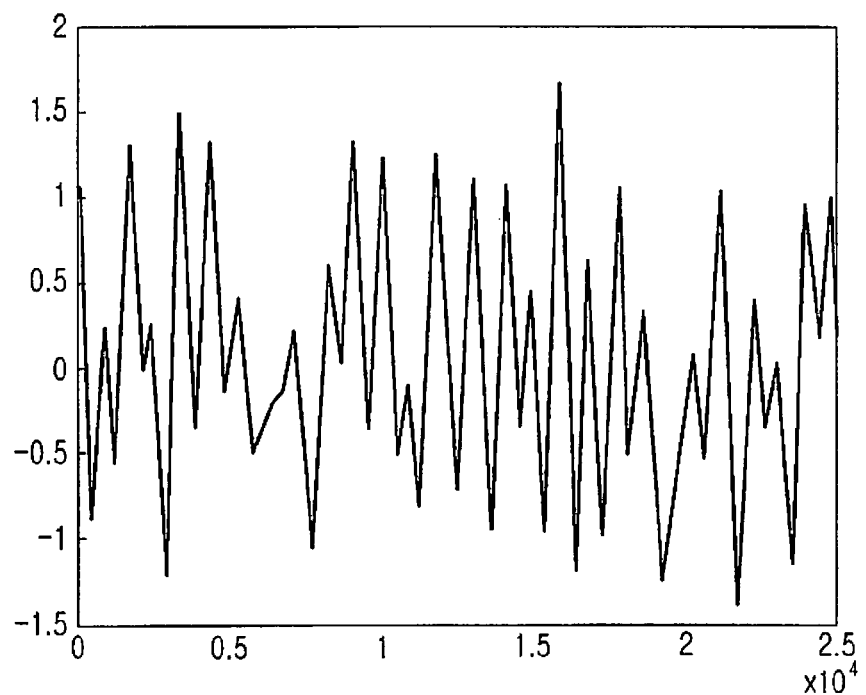
FIG. 7 illustrates an ideal Rayleigh channel, according to an embodiment of the present invention.
Figure 8:
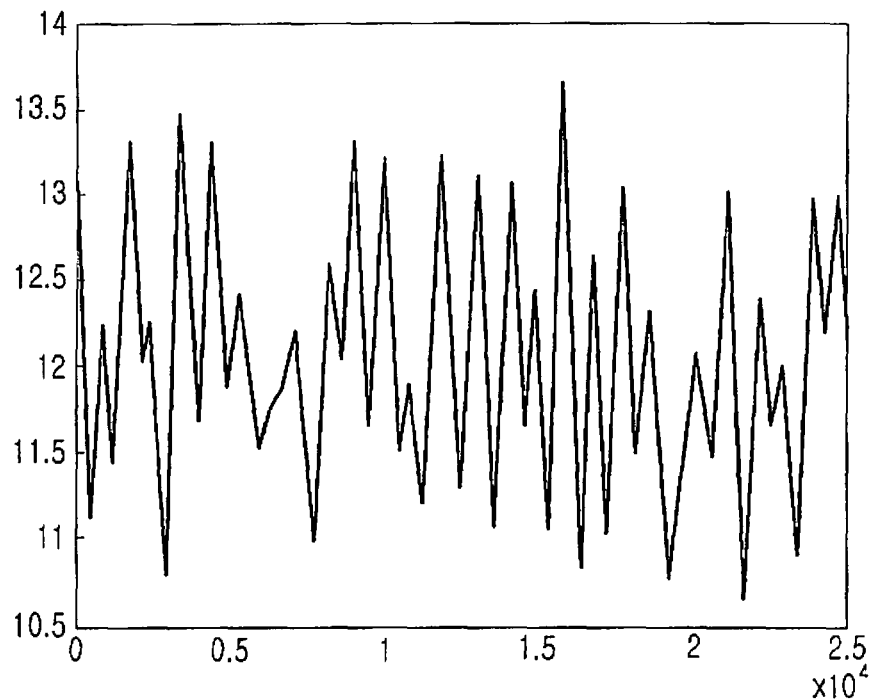
FIG. 8 illustrates a Rayleigh channel with interference, according to an embodiment of the present invention.

In order to verify the performance improvement obtained in embodiments of the present invention, computer simulation results are provided. In the simulation, Rayleigh fading channels with independent but identical distribution are simulated. FIG. 7 and FIG. 8 illustrate an ideal Rayleigh channel and a Rayleigh channel with interference. The Doppler frequency shift is assumed to be 30 Hz, which can be translated to a corresponding moving speed. The simulation results are illustrated in FIGS. 9 and 10.

Figure 9:
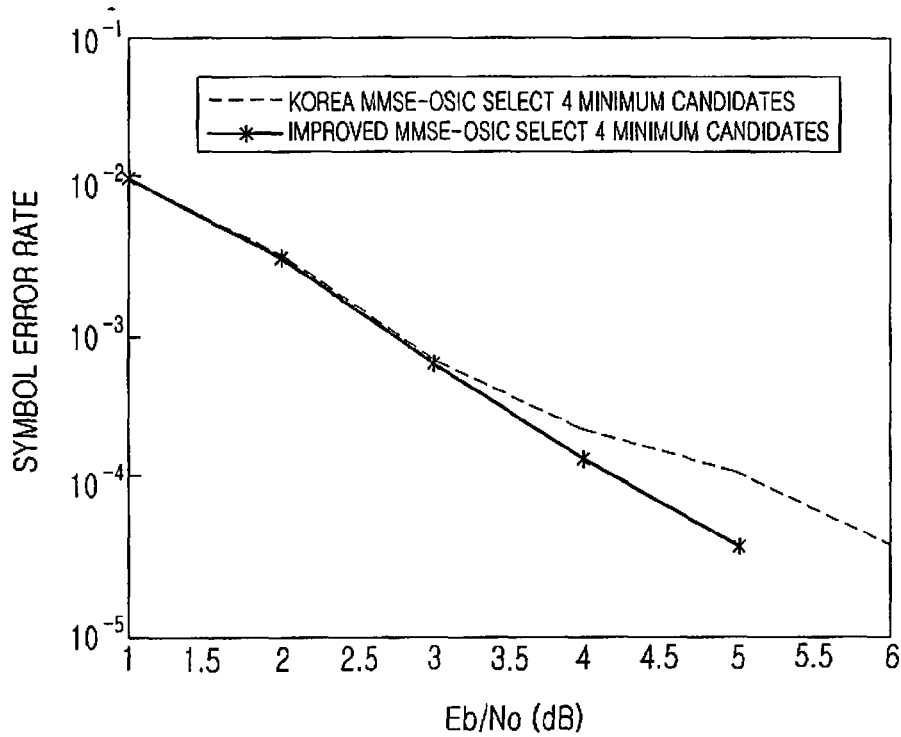
FIG. 9 shows a simulation result of average error probability, according to an embodiment of the present invention.
Figure 10:
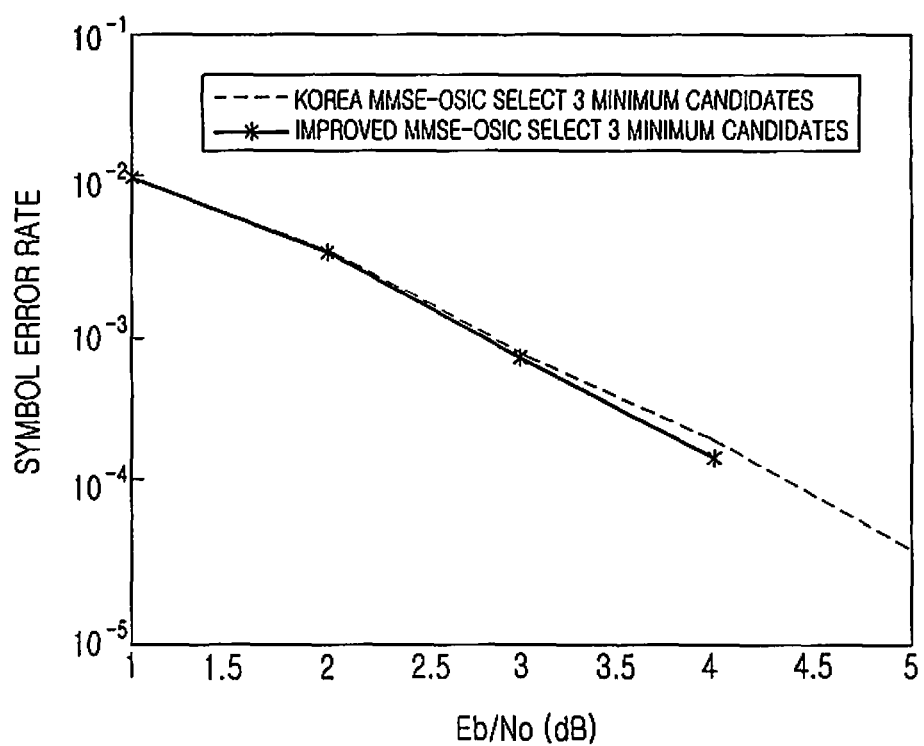
FIG. 10 shows a simulation result of average error probability, according to an embodiment of the present invention.

From FIGS. 9 and 10, it can be seen that when compared with conventional MIMO transmitting and receiving methods, the embodiments of the present invention have superior performance. In the case of low Signal-to-Noise Ratio (SNR), 1 dB performance improvement can be gained with a method according to an embodiment of the present invention. 1 dB performance gain is a significant improvement to a MIMO receiver.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An Orthogonal Frequency Division Multiplexing (OFDM) symbol detection method, comprising steps of:
   receiving OFDM modulated symbols transmitted from a plurality of transmitting antennas;
   receiving information on at least one of a correlation time and a correlation bandwidth from the plurality of transmitting antennas;
   performing channel estimation on each of a plurality of channels for the plurality of transmitting antennas, and conducting smoothing processing on each channel estimation result according to the information on the at least one of the correlation time and the correlation bandwidth, to obtain channel estimation averages of respective channels; and
   performing signal detection on the received OFDM modulated symbols by using the channel estimation averages.

2. The method of claim 1, wherein the information on the correlation time comprises a number of OFDM modulated symbols within the correlation time, and the information on the correlation bandwidth comprises a number of OFDM sub-carriers within the correlation bandwidth.

3. The method of claim 2, wherein conducting the smoothing processing comprises conducting a sliding averaging process on values representing the plurality of channels in at least one of a time domain and a frequency domain to obtain the channel estimation averages for the plurality of channels, wherein a number of the plurality of channels is a value obtained by the number of OFDM sub-carriers multiplied by the number of OFDM modulated symbols.

4. The method of claim 3, wherein a size of a window for the sliding averaging process is adaptively adjusted so that the size of the window increases as a rate of channel fading of a channel decreases.

5. The method of claim 3, wherein an adaptive channel interference elimination process is performed on the channel estimation averages subject to the sliding averaging process.

6. The method of claim 5, wherein the adaptive channel interference elimination process comprises comparing a first average channel correlation value $h_{1avg}$ and a second average channel correlation value $h_{2avg}$, both values being subject to the sliding averaging process, comparing a first channel correlation value $h_1$ and a second channel correlation value $h_2$, and processing the received OFDM modulated symbols according to the comparison results.

7. The method of claim 6, wherein if $h_{1avg}$ is greater than $h_{2avg}$ and $h_1$ is greater than $h_2$, the received OFDM modulated symbols are processed by using $h_1$ and $h_2$.

8. The method of claim 6, wherein if $h_{1avg}$ is greater than $h_{2avg}$ and $h_1$ is not greater than $h_2$, the received OFDM modulated symbols are processed by using $h_{1avg}$ and $h_{2avg}$.

9. The method of claim 6, wherein if $h$ not greater than $h_{2avg}$ and $h_1$ is greater than $h_2$, the received OFDM modulated symbols are processed is processed by using $h_{1avg}$ and $h_2$.

10. The method of claim 6, wherein if $h_{1avg}$ is not greater than $h_{2avg}$ and $h_1$ is not greater than $h_2$, the received OFDM modulated symbols are processed by using $h_1$ and $h_2$.

11. An Orthogonal Frequency Division Multiplexing (OFDM) communication system, comprising:
a transmitting end, having a plurality of transmitting antennas for transmitting OFDM modulated symbols and information on at least one of a correlation time and a correlation bandwidth to a receiving end;
the receiving end, having a plurality of receiving antennas for receiving the OFDM modulated symbols, a number of correlated sub-carriers and a number of correlated OFDM symbols, from the transmitting end;
a smoothing filter for conducting smoothing filtering to each channel estimation result according to the information on the at least one of the correlation time and the correlation bandwidth, wherein the channel estimation result is obtained by implementing channel estimation on each of a plurality of channels for the plurality of transmitting antennas, to obtain channel estimation averages of respective channels; and
a signal detection module for performing signal detection on the received OFDM modulated symbols by using the channel estimation averages of the plurality of channels.

12. A Multiple-Input Multiple-Output (MIMO) receiver in an Orthogonal Frequency Division Multiplexing (OFDM) communication system, comprising:
a receiving end, having a plurality of receiving antennas for receiving OFDM modulated symbols, a number of correlated sub-carriers and a number of correlated OFDM symbols, from a transmitting end;
a smoothing filter for conducting smoothing filtering to each channel estimation result according to information on at least one of a correlation time and a correlation bandwidth, wherein the channel estimation result is obtained by implementing channel estimation on each of a plurality of channels for a plurality of transmitting antennas, to obtain channel estimation averages of respective channels; and
a signal detection module for performing signal detection on the received OFDM modulated symbols by using the channel estimation averages of the plurality of channels.

13. The MIMO receiver of claim 12, wherein the information on the correlation time comprises a number of OFDM modulated symbols within the correlation time, and the information on the correlation bandwidth comprises a number of OFDM sub-carriers within the correlation bandwidth.

14. The MIMO receiver of claim 13, wherein conducting the smoothing filtering comprises conducting a sliding averaging process on values representing the plurality of channels in at least one of a time domain and a frequency domain, to obtain the channel estimation averages for the plurality of channels,
wherein a number of the plurality of channels is a value obtained by the number of OFDM sub-carriers multiplied by the number of OFDM modulated symbols.

15. The MIMO receiver of claim 14, wherein a size of a window for the sliding averaging process is adaptively adjusted so that the size of the window increases as a rate of channel fading of a channel decreases.

16. The MIMO receiver of claim 14, wherein an adaptive channel interference elimination process is performed on the channel estimation averages subject to the sliding averaging process.

17. The MIMO receiver of claim 16, wherein the adaptive channel interference elimination process comprises comparing a first average channel correlation value $h_{1avg}$ and a second average channel correlation value $h_{2avg}$, both values being subject to the sliding averaging process, comparing a first channel correlation value $h_1$ and a second channel correlation value $h_2$, and processing the received OFDM modulated symbols according to the comparison results.

18. The MIMO receiver of claim 17, wherein:
if $h_{1avg}$ is greater than $h_{2avg}$ and $h_1$ is greater than $h_2$, the received OFDM modulated symbols are processed by using $h_1$ and $h_2$;
if $h_{1avg}$ is greater than $h_{2avg}$ and $h_1$ is not greater than $h_2$, the received OFDM modulated symbols are processed by using $h_1$ and $h_{2avg}$;
if $h_{1avg}$ is not greater than $h_{2avg}$ and $h_1$ is greater than $h_2$, the received OFDM modulated symbols are processed by using $h_{1avg}$ and $h_2$; and
if $h_{1avg}$ is not greater than $h_{1avg}$ and $h_1$ is not greater than $h_2$, the received OFDM modulated symbols are processed by using $h_1$ and $h_2$.

* * * * *

UNITED STATES PATENT AND TRADEMARK OFFICE
CERTIFICATE OF CORRECTION

PATENT NO. : 8,532,216 B2  
APPLICATION NO. : 12/993752  
DATED : September 10, 2013  
INVENTOR(S) : Zhousong Huang et al.

Page 1 of 1

It is certified that error appears in the above-identified patent and that said Letters Patent is hereby corrected as shown below:

On the Title Page, Item (30) Foreign Application Priority Data:

"2008 1 0097162" should be -- 2008 1 0097162.6 --

Signed and Sealed this  
First Day of April, 2014

Michelle K. Lee  
*Deputy Director of the United States Patent and Trademark Office*